United States Patent
Kumar et al.

(10) Patent No.: US 12,553,378 B1
(45) Date of Patent: Feb. 17, 2026

(54) PERFORMANCE ENHANCEMENT OF DIVIDED EXHAUST BOOST (DEB) ENGINE

(71) Applicant: SAUDI ARABIAN OIL COMPANY, Dhahran (SA)

(72) Inventors: Praveen Kumar, New Hudson, MI (US); Xin Yu, Novi, MI (US); Anqi Zhang, Canton, MI (US); Andrew Baur, Whitmore Lake, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/041,212

(22) Filed: Jan. 30, 2025

(51) Int. Cl.
*F02B 37/12* (2006.01)
*F01N 3/28* (2006.01)
*F01N 13/10* (2010.01)
*F02B 37/02* (2006.01)

(52) U.S. Cl.
CPC ............ *F02B 37/12* (2013.01); *F01N 3/2892* (2013.01); *F01N 13/10* (2013.01); *F02B 37/025* (2013.01); *F01N 2560/025* (2013.01); *F01N 2560/026* (2013.01)

(58) Field of Classification Search
CPC .... F02B 37/012; F02B 37/025; F01N 3/2892; F01N 3/08; F01N 3/101; F01N 2560/025; F01N 2560/026
See application file for complete search history.

(56) References Cited

U.S. PATENT DOCUMENTS

| | | | |
|---|---|---|---|
| 9,051,871 B1 * | 6/2015 | Wu | ............... F02D 41/0087 |
| 9,133,745 B2 | 9/2015 | Zahdeh et al. | |
| 10,041,448 B2 | 8/2018 | Glugla | |
| 10,107,182 B2 | 10/2018 | VanDerWege | |
| 10,161,324 B2 | 12/2018 | Ulrey et al. | |
| 10,364,757 B2 | 7/2019 | Leone et al. | |
| 10,787,949 B2 | 9/2020 | McConville et al. | |
| 2014/0352300 A1 * | 12/2014 | Keating | ............... F02B 37/025 |
| | | | 60/612 |

OTHER PUBLICATIONS

D.B. Roth, et al., "Divided-Exhaust Turbocharger System with Boost-Valve," SAE Technical Paper 2018-01-0895, 2018 (9 pages).
L. Kocsis, et al., "Influences of Electrically Assisted Charging Upon Functional Parameters of the S.I. Engines," Research Journal of Agricultural Science, 2012 (7 pages).
P. Kumar, et al., "Divided Exhaust Period Assessment for Fuel-Enrichment Reduction in Turbocharged Spark-Ignition Engines," SAE Int. J. Engines, 2024 (16 pages).

* cited by examiner

*Primary Examiner* — Ngoc T Nguyen
(74) *Attorney, Agent, or Firm* — Osha Bergman Watanabe & Burton LLP (57) ABSTRACT

A divided exhaust boost (DEB) engine includes: a plurality of cylinders; a turbocharger that includes a first scroll and a second scroll; a first exhaust passage through which a first group of the plurality of the cylinders sends a first exhaust stream generated by the first group to the first scroll; a second exhaust passage through which a second group of the plurality of the cylinders send a second exhaust stream generated by the second group to the second scroll; a catalyst; a third exhaust passage through which all of the plurality of cylinders send a third exhaust stream to the catalyst; a scavenge valve disposed in the third exhaust passage and configured to control a flow rate of the third exhaust stream; and an Electronic Control Unit (ECU) that controls, by controlling an aperture of the scavenge valve, a flow rate of the third exhaust stream.

20 Claims, 9 Drawing Sheets

PERFORMANCE ENHANCEMENT OF DIVIDED EXHAUST BOOST (DEB) ENGINE

BACKGROUND

Stringent emissions requirements imposed by government authorities require advancements in engine thermal efficiency and emissions after-treatment systems. As a result, high-efficiency combustion engines are being pursued for their environmental benefits. Due to the variety and number of possible emissions after-treatment system configurations, a low cost, simple engine and emission after-treatment system capable of reducing emissions without introducing undue complexity is desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments, a divided exhaust boost (DEB) engine. The DEB engine includes: a plurality of cylinders, each cylinder being configured to form a containment boundary that contains a corresponding combustion reaction of a plurality of combustion reactions; a turbocharger that includes a first scroll and a second scroll, wherein the turbocharger is configured to be actuated by exhaust gases produced by the plurality of combustion reactions; a first exhaust passage through which a first group of the plurality of the cylinders sends a first exhaust stream generated by the first group to the first scroll; a second exhaust passage through which a second group of the plurality of the cylinders send a second exhaust stream generated by the second group to the second scroll; a catalyst configured to receive the first exhaust stream and the second exhaust stream directly from the turbocharger; a third exhaust passage through which all of the plurality of cylinders send a third exhaust stream to the catalyst; a scavenge valve disposed in the third exhaust passage and configured to control a flow rate of the third exhaust stream; and an Electronic Control Unit (ECU) that controls, by controlling an aperture of the scavenge valve, a flow rate of the third exhaust stream that is fed into the catalyst based on an operation load of the turbocharger. The ECU controls a flow rate of a remaining exhaust stream that includes the first exhaust stream and the second exhaust stream sent to the turbocharger, by controlling the flow rate of the third exhaust stream fed into the catalyst.

In another aspect, this disclosure presents, in accordance with one or more embodiments, a method for controlling a DEB engine, wherein the DEB engine includes: a plurality of cylinders, each cylinder being configured to form a containment boundary that contains a corresponding combustion reaction of a plurality of combustion reactions; a turbocharger that includes a first scroll and a second scroll, wherein the turbocharger is configured to be actuated by exhaust gases produced by the plurality of combustion reactions; a first exhaust passage through which a first group of the plurality of the cylinders sends a first exhaust stream generated by the first group to the first scroll; a second exhaust passage through which a second group of the plurality of the cylinders send a second exhaust stream generated by the second group to the second scroll; a catalyst configured to receive the first exhaust stream and the second exhaust stream directly from the turbocharger; a third exhaust passage through which all of the plurality of cylinders send a third exhaust stream to the catalyst; and a scavenge valve disposed in the third exhaust passage and configured to control a flow rate of the third exhaust stream. The method includes: controlling the plurality of combustion reactions using the plurality of cylinders; controlling a flow rate of the third exhaust stream that is fed into the catalyst, by controlling an aperture of the scavenge valve, based on an operation load of the turbocharger; and controlling a flow rate of a remaining exhaust stream that includes the first exhaust stream and the second exhaust stream sent to the turbocharger, by controlling the flow rate of the third exhaust stream fed into the catalyst.

Any combinations of the various embodiments and implementations disclosed herein can be used in a further embodiment, consistent with the disclosure. Other aspects and advantages of the claimed subject matter will be apparent from the following description and the claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed towards a divided exhaust boost (DEB) engine that uses a scavenge valve to control a flow rate of exhaust streams that stream into a turbocharger. By controlling the flow rate of the exhaust streams that stream into the turbocharger, the operation of the turbocharger may be controlled based on the functionality of the scavenge valve. The functionality may be, for example, a target torque, a target power, or a Revolution Per Minute (RPM) of the engine. However, the functionality is not limited to only these examples and the operation of the turbocharger may be controlled based on other parameters.

Figure 1A:
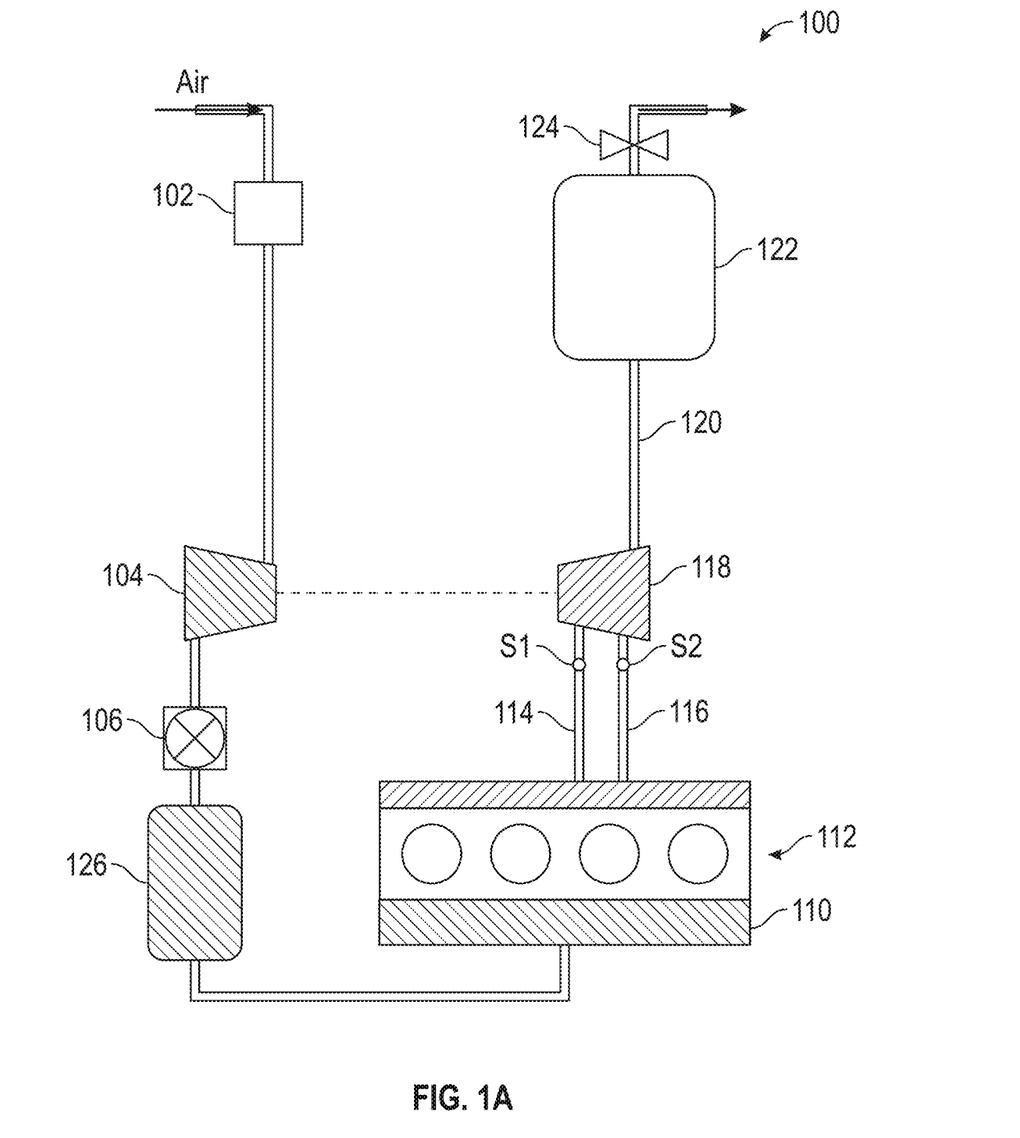
FIG. 1A depicts a gasoline Spark-Ignition (SI) engine in accordance with one or more embodiments disclosed herein.

FIG. 1A shows a conventional gasoline Spark-Ignition (SI) engine (100) that includes a filter (102) embodied as a cold air intake filter that filters the intake air that enters the SI engine (100), an electronic control unit (ECU) (143) that controls one or more operations of the SI engine (100), and a compressor (104) that compresses the intake air. The compression of the air enables burning more fuel and consequently an increase in the generated power and torque of the engine (100). The SI engine (100) further includes an Intake Air Temperature (IAT) sensor (106), embodied as a thermistor or thermocouple, that measures the temperature of the air that flows into the compressor (104). The ECU (143) optimizes the air-fuel mixture and ignition timing based on the measured temperature. By knowing the temperature of the incoming air, the ECU (143) can adjust fuel injection and timing to ensure efficient combustion, improve engine performance, and reduce emissions.

The SI engine (100) further includes a charge air cooler (CAC) (126) that cools the compressed air before it enters the engine's intake manifold (IM) (110). This cooling process increases the air's density, allowing more oxygen to enter the combustion chamber of the engine. As a result, the engine burns fuel efficiently, producing more power while reducing the risk of knocking and improving overall engine performance. The IM (110) feeds the compressed air into a plurality of cylinders (112). The IM (110) may be formed as a plenum with one input and multiple outlets, where each output transmits air (or an air fuel mixture) to an associated cylinder (112) Each cylinder (112) forms a containment boundary that contains a corresponding combustion reaction in the DEB engine (101).

The CAC (126) cools engine inlet air after it has passed through a turbocharger, but before it enters the engine, to a lower temperature, for the optimum power for the combustion process within the engine. As the air is compressed, it absorbs energy. Energy equals heat; so, the temperature of the air increases as the pressure increases. Over time, the heat would dissipate, but for the engine the air is required immediately. For this reason, the intercooler may be designed to cool the air quickly using cold water. The heat (energy) is exchanged from the hot air to the cool water as the two mediums pass by each other in the CAC (126). The cool water passes through multiple tubes within the CAC (126). The tubes may have fins attached to them that have the effect of extending the surface area of the exterior of the tubes. In this way, more of the outer surface of the tube is in contact with the hot air. The heat passes from the air, into the fins, through the wall of the tube and into the water. The tubes and fins are manufactured from material(s) that are capable of conducting energy. The material(s) must also withstand the water and the air, both of which often have contamination. Consequently, copper fins or copper nickel tubes may be used.

The plurality of cylinders (112) send a first exhaust stream through a first exhaust passage (114) and a second exhaust stream through a second exhaust passage (116) to a twin-scroll turbocharger (118), which includes a turbine. Dividing the exhaust of the cylinders (112) into two separate exhaust streams that are fed into the twin-scroll turbocharger (118) is a technique used to improve turbocharger efficiency and engine performance. This separation prevents interference between the exhaust pulses, which can lead to more efficient scavenging of exhaust gases from the cylinders (112). These paths may be arranged so that exhaust pulses from cylinders that have firing orders further apart (and thus less overlap in exhaust pulse timing) are grouped together.

In the twin-scroll turbocharger (118), the turbocharger's turbine housing is divided into two scrolls (S1, S2), with each scroll (S1, S2) receiving exhaust gases from one of the two passages (114, 116). Because the exhaust pulses are separated and timed to reduce interference, each scroll (S1, S2) receives a more consistent and powerful stream of exhaust gases. The scrolls (S1, S2) direct exhaust gases to different locations of the turbocharger (118); a first channel that corresponds to the first scroll (S1) goes to the outer surface of the turbocharger (118) and a second channel that corresponds to the second scroll (S2) goes to the inner surface of the turbocharger (118).

After passing through the twin-scroll turbocharger (118), the combination of the first exhaust stream and the second exhaust stream are fed, through a fourth exhaust passage (120), into a catalyst (122). In one or more embodiments, the catalyst (122) may be a three-way catalyst (TWC). A TWC reduces harmful emissions for example by converting carbon monoxide (CO), hydrocarbons (HC), and nitrogen oxides (NOx) into less harmful substances like carbon dioxide ($CO_2$), water ($H_2O$), and nitrogen ($N_2$). The TWC uses chemical reactions to clean the exhaust gases, helping the engine meet emission standards and reduce environmental pollution.

A bypass valve (BPV) (124) after the catalyst (122) redirects exhaust gases around the catalyst (122) when the catalyst (122) is not needed, typically during engine conditions that do not require full emissions control. This helps improve engine efficiency and performance by reducing exhaust backpressure when the catalyst (122) is not actively needed for emissions reduction. In addition to reducing backpressure, the BPV (124) can help in managing exhaust temperatures, protecting the catalyst (122) from overheating during high-load conditions. By diverting exhaust gases, potential damage to the catalyst (122) can be prevented and optimal engine performance can be maintained.

Figure 1B:
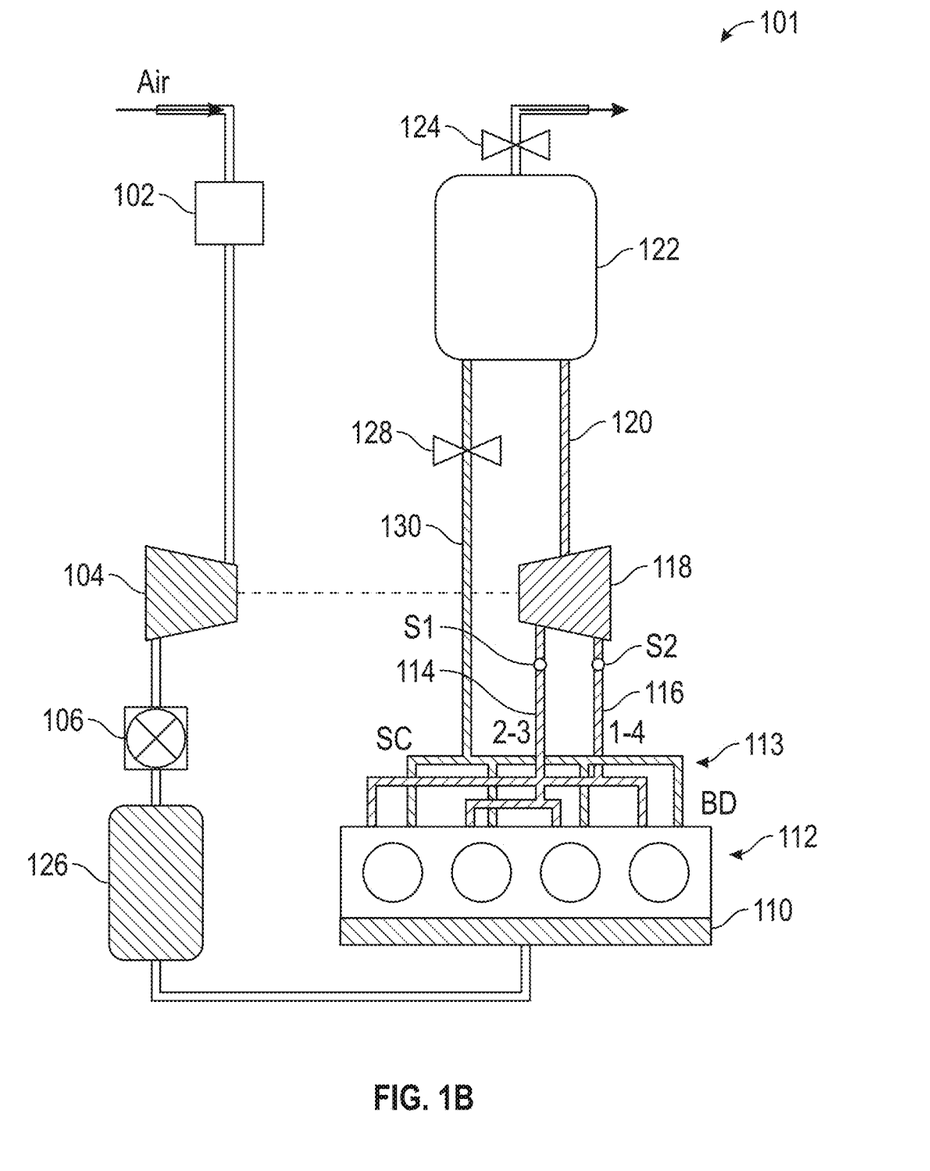
FIG. 1B depicts a Divided Exhaust Boost (DEB) engine with a Paired Cylinder Exhaust Boost (PCEB) manifold in accordance with one or more embodiments disclosed herein.

FIG. 1B shows a DEB engine (101), with a Paired Cylinder Exhaust Boost (PCEB) manifold (113), that includes elements similar to the elements of the conventional engine (100) shown in FIG. 1A. For example, the DEB engine (101) includes a filter (102), a compressor (104), an IAT sensor (106), a CAC (126), an IM (110), and a plurality of cylinders (112) that send a first exhaust stream through a first exhaust passage (114) and a second exhaust stream through a second exhaust passage (116) to a twin-scroll turbocharger (118). For example, in the four-cylinder DEB engine shown in FIG. 1B, the cylinders are numbered 1, 2, 3, and 4 from left to right. In FIG. 1B, cylinders 2 and 3 are grouped as a first group and together send a first exhaust stream into the first scroll (S1) of the turbocharger (118) via the first exhaust passage (114). Cylinders 1 and 4 are grouped as a second group and together send a second exhaust stream into the second scroll (S2) of the turbocharger (118) via the second exhaust passage (116). The DEB engine (101) further includes a catalyst (122), which receives the combination of the first exhaust stream and the second exhaust stream through a fourth exhaust passage (120), and a BPV (124). The catalyst (122) of FIG. 1B may be embodied as a Three Way catalyst (TWC) as discussed above.

In juxtaposition to FIGS. 1A and 1n accordance with one or more embodiments, the DEB engine (101) further includes a third exhaust passage (130), through which all of the plurality of cylinders (112) send a third exhaust stream to a scavenge valve (128) that is disposed in the third exhaust passage (130). The first exhaust passage (114), the second exhaust passage (116), and the third exhaust passage (130) are fluidly connected to the plurality of cylinders (112) by way of a Paired Cylinder Exhaust Boost (PCEB) manifold (113). The DEB engine (101) includes an ECU (143) that controls the scavenge valve (128). Accordingly, some of the total exhaust gases produced in the plurality of cylinders (112) may stream through the third exhaust passage (130) and a remaining exhaust stream that includes the first exhaust stream and the second exhaust stream will stream through the first exhaust passage (114) and the second exhaust passage (116). By controlling the scavenge valve (128), the ECU (143) can control the amount of the remaining exhaust stream that goes into the turbocharger (118). After passing through the scavenge valve (128), the third exhaust stream is fed into the catalyst (122).

Figure 1C:
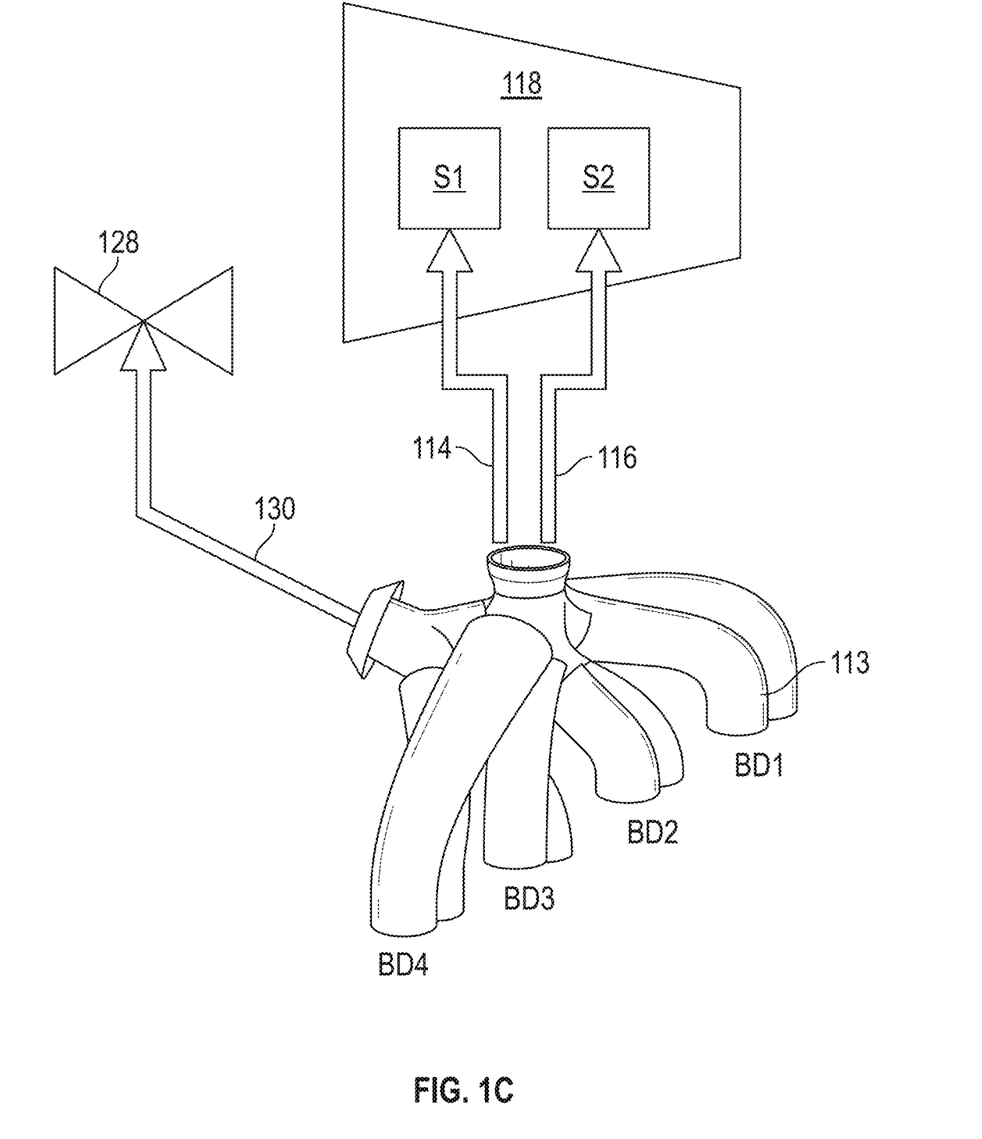
FIG. 1C depicts a PCEB manifold in accordance with one or more embodiments disclosed herein.

FIG. 1C shows a partial view of the DEB engine (101) with the PCEB manifold (113) and further illustrates the passage of the first exhaust stream, the second exhaust stream, and the third exhaust stream, by way of an example. In FIG. 1C, Blow Down 1 (BD1) through BD4 may respectively correspond to cylinders 1 to 4. Each BD in FIG. 1C comprises two passages, one of which extends to the third exhaust passage (130) and the scavenge valve (128). The other BD passage extends to the either the first exhaust passage (114) and the second exhaust passage (116), depending on the cylinder that the exhaust passage extends from, and subsequently will go to one of the two scrolls (S1, S2) of the turbocharger (118).

According to one or more embodiments, in the DEB engine (101), the ECU (143) may control, by controlling the scavenge valve (128), a flow rate of the third exhaust stream that is fed into the catalyst (122). The ECU (143) may control the flow rate of the third exhaust stream that is fed into the catalyst (122) based on an operation load of the turbocharger (118). For example, the ECU (143) may control the flow rate of the third exhaust stream based on a target/required torque, power, engine speed measured in Rotations Per Minute (RPMs), or other functionalities of the DEB engine (101). As such, the scavenge valve (128) may control the flow rate of the third exhaust stream that is fed into the catalyst (122) as instructed by the ECU (143). Additionally, the ECU (143) may control a flow rate of the remaining exhaust stream that includes the first exhaust stream and the second exhaust stream that are sent to the turbocharger (118), by controlling the flow rate of the third exhaust stream fed into the catalyst (122). Accordingly, the ECU (143) can control the load of the exhaust steams on the turbocharger (118) and catalyst (122). In this way and as further demonstrated below, the ECU (143) can control the operation power and torque of the DEB engine (101). According to one or more embodiments, the ECU (143) can also control the pressure pulsation in the turbocharger (118).

According to one or more embodiments, the ECU (143) may control the flow rate of the third exhaust stream that streams in the third exhaust passage (130) and is fed into the catalyst (122) based on a remaining Nitrogen Oxide (NOx) capacity of the catalyst (122). For example, the ECU (143) may determine, using a NOx sensor (e.g., FIG. 2), that the catalyst (122) is reaching its capacity limits for converting emission gases and control the scavenge valve (128) based on the NOx content detected by the NOx sensor increasing, which correlates to the NOx content of the catalyst (122) meeting or exceeding a predetermined threshold. Alternatively, the ECU (143) may anticipate, based on a theoretical exhaust volume estimated based upon DEB engine (101) runtime and the structure of the catalyst (122), that the catalyst (122) is nearing capacity. Continuing with these examples, when the ECU (143) determines that the NOx content is nearing (i.e., within a specified percentage of) the predetermined threshold or is nearing its anticipated capacity, the ECU (143) reduces the aperture of the scavenge valve (128) to increase the amount of exhaust gases fed to the turbine of the turbocharger (118). In the event that the NOx content exceeds the theoretical capacity of the catalyst (122), the scavenge valve (128) may be closed or substantially closed to force all or nearly all of the exhaust gases to actuate the turbine of the turbocharger (118). Similar determinations may be implemented by the ECU (143) on the basis of Oxygen content (i.e., $O_2$) detected by an oxygen sensor (e.g., FIG. 2) in lieu of NOx content detected by a NOx sensor (e.g., FIG. 2).

According to one or more embodiments, the ECU (143) may estimate the catalytic conversion capacity of the catalyst (122). To this end, the ECU (143) may calculate (based on various engine operating parameters) or measure (using a volumetric flow rate sensor, not shown) a volume of exhaust gases that pass through the scavenge valve (128) to the catalyst (122). The ECU (143) can determine whether the catalyst (122) is reaching its conversion rate capacity, based on the known production rate of exhaust gases and the conversion (i.e., adsorption) rate of the catalyst (122). If the ECU (143) determines that the catalyst (122) is reaching or has exceeded its conversion capacity, the ECU (143) may control the scavenge valve (128) to send more gases to the turbocharger (118) and less exhaust gases through the third exhaust passage (130). The turbocharger (118) captures some of the energy of the exhaust gases and thus, the gases that leave the turbocharger (118) to the catalyst (122) through the fourth exhaust passage (120) have less energy in the catalyst (122) and more time to convert. However, these calculations may be complex and thus, may require the ECU (143) to perform heavy and complex processing.

According to one or more embodiments, there may be one or more gas sensors after the catalyst (122) or toward the output of the catalyst (122). Such gas sensor(s) may detect gas streams such as NOx, CO, or $O_2$ leaving the catalyst (122). The ECU (143) may receive the measurements of the one or more sensors and determine whether the catalyst (122) is reaching or has exceeded its conversion capacity, based on the measurements. For example, the ECU (143) determines, based on the measurements of the sensor(s), that the NOx or CO content of the exhaust stream after leaving the catalyst is more than a first threshold, or that the $O_2$ content of the exhaust stream is less than a second threshold. On this basis, the ECU (143) may determine that the catalyst (122) has reached or exceeded its conversion capacity and cannot convert excess NOx or CO. Then, the ECU (143) may control the scavenge valve (128) based on the measurements of the sensor(s). For example, when the sensor(s) detect that flow rate of NOx or CO is reaching or exceeding the first threshold or that the flow rate of $O_2$ has dropped to lower than the second threshold, the ECU (143) may control the aperture of the scavenge valve (128) to send more exhaust gases to the turbocharger (118). The turbocharger (118) captures some of the energy of the exhaust gases by converting the energy to the torque of the turbine. Then, the exhaust gases leaving the turbocharger (118) to the catalyst (122), through the fourth exhaust passage (120), will have less energy in the catalyst (122) and more time to convert. This process lowers the energy of the gases entering the catalyst (122) and help the catalyst (122) to operate more effectively.

According to one or more embodiments, the ECU (143) may control the flow rate of the third exhaust stream fed into the catalyst (122) based on a compression rate of the compressor (104). The ECU (143) may control a flow rate of the compressed air that is fed in to the IM (110) based on the flow rate of the third exhaust stream fed into the catalyst (122). In this regard, the ECU (143) may receive an acceleration request from a driver (not shown) of a vehicle (not shown), which indicates that the driver desires additional power from the DEB engine (101). To provide the additional power, the ECU (143) decreases the aperture of the scavenge valve (128) to a partially or fully closed position. This causes a bulk of the exhaust gases to be directed towards the turbine of the turbocharger (118), which increases the rotation speed of the compressor (104). The increase in the rotation speed of the compressor (104) leads to an increase in engine intake air pressure, resulting in an increase in output power and Brake Mean Effective Pressure (BMEP).

According to one or more embodiments, the ECU (143) may control the flow rate of the third exhaust stream fed into the catalyst (122) based on a target power, a target RPM, or a target torque of the DEB engine (101). Under low load conditions (i.e., low torque, low engine (101) rotation speed), and if the catalyst (122) has not reached capacity, the ECU (143) fully or partially opens the scavenge valve (128) to direct the bulk of the exhaust gases to the catalyst (122). This reduces the rotation speed of the turbine of the turbocharger (118), and allows the engine to operate at lower intake air pressures while avoiding backflow of exhaust gases into the engine (101). The engine (101) rotation speed may be measured using a crankshaft position sensor (not shown) as is commonly known in the art.

According to one or more embodiments, the ECU (143) may control the flow rate of the third exhaust stream fed into the catalyst (122), to control the flow rate of the remaining exhaust stream sent to the turbocharger (118), based on a pressure inside the turbocharger (118). For example, if the turbocharger (118) does not rotate at a sufficient speed to overcome the rotational inertia of the turbine of the turbocharger (118), the ECU (143) may control the scavenge valve (128) to a reduced aperture at low load conditions in order to provide more exhaust gas flow to the turbine of the turbocharger (118). The scavenge valve (128) may be similarly controlled based upon the turbocharger's (118) enthalpy or efficiency. For example, at low load speeds turbocharger's (118) efficiency may drop and enthalpy may remain substantially unchanged as a result of the inability of the exhaust gases to sufficiently actuate the turbine of the turbocharger (118). In such cases, the ECU (143) may control the scavenge valve (128) to maintain a minimum exhaust gas flow in the first exhaust passage (114) and the second exhaust passage (116) to operate the turbocharger (118) at a desired efficiency or enthalpy value. The ECU (143) may derive the turbine's (118) rotation speed, operation load, efficiency, enthalpy, or other related parameters based upon the geometry of the turbine (118), the compressor (104), and the amount of air compression provided by the compressor (104) as measured by an $O_2$ sensor upstream of the cylinders. Alternatively, the ECU (143) may estimate the operation load of the turbine (118) by deriving the estimated exhaust gas flow rate from the crankshaft rotation speed, and estimating the operation load of the turbine (118) based on the turbine (118) geometry and the estimated exhaust gas flow rate.

According to one or more embodiments, the scavenge valve (128) may form a single valve that controls a ratio between the flow rate of the third exhaust stream fed into the catalyst (122) and the flow rate of the remaining exhaust stream sent to the turbocharger (118). This design provides simplicity for controlling the flow rate of the remaining exhaust stream sent to the turbocharger (118) by using a single valve, which is the scavenge valve (128), rather than a complex design.

Figure 2:
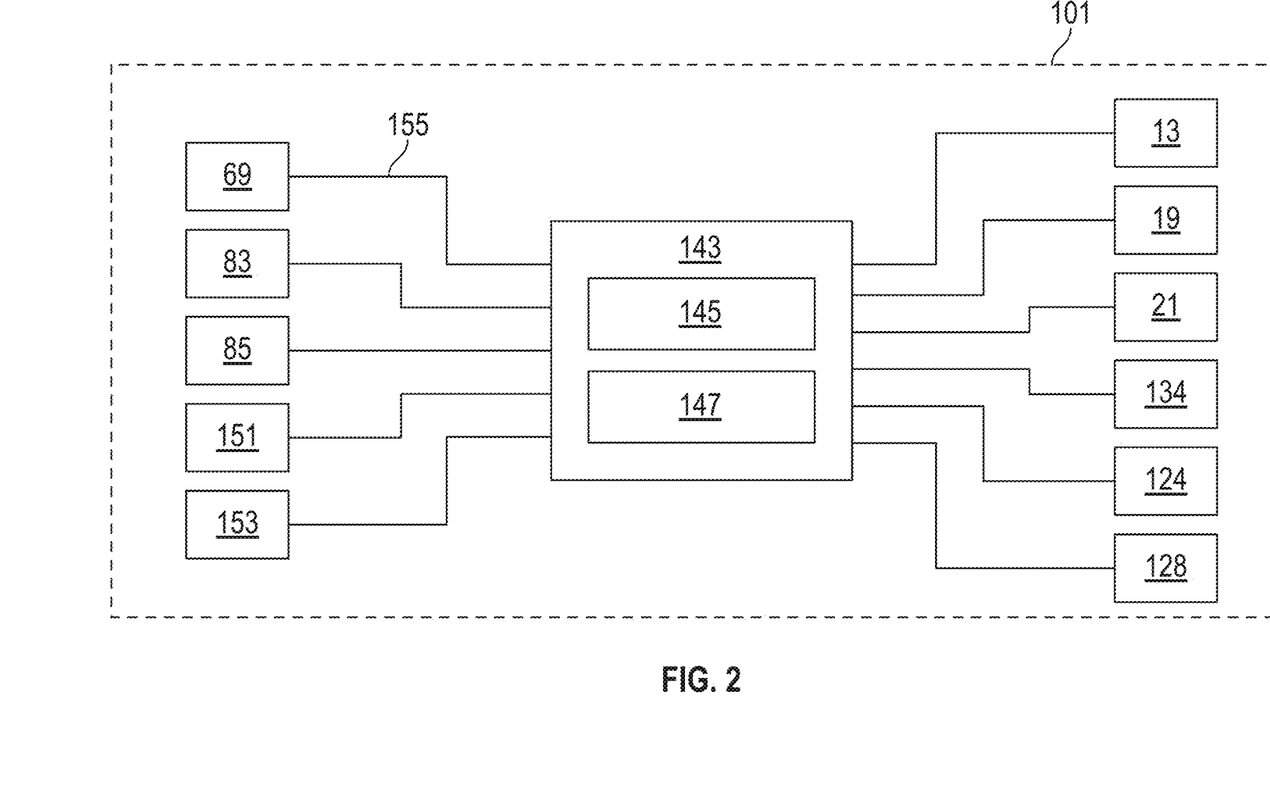
FIG. 2 depicts a block diagram of a DEB engine in accordance with one or more embodiments disclosed herein.

FIG. 2 depicts a hardware block diagram of the DEB engine in accordance with one or more embodiments disclosed herein. More specifically, FIG. 2 depicts components electrically connected to the ECU (143). As described herein, the ECU (143) is one or more processors, microprocessors, logic units, controllers, and/or integrated circuits that receive, process, and transmit commands to operate components of the DEB engine (101). The ECU (143) is formed of a memory (145) and a processor (147). The memory (145) includes a non-transitory storage medium such as flash memory, a Hard Disk Drive (HDD), a solid state drive (SSD), a combination thereof, or equivalent storage devices. In relation to the invention as described herein, the memory (145) stores computer readable instructions, executed by the processor (147), that controls the various hardware components of the DEB engine (101) described in relation to FIGS. 1B and 1C. The memory (145) further stores instructions to receive data from the various sensors described in relation to FIGS. 1B and 1C, for example IAT, or sensors that monitor operations of other components such as the compressor, turbocharger, catalyst, etc. The processor (147) is formed by one or more processors, integrated circuits, microprocessors, or equivalent computing structures that serve to execute the computer readable instructions stored on the memory (145).

According to one or more embodiment, the memory (145) is a non-transitory computer readable medium (CRM) that contains instructions for performing the functions of the ECU (143).

Components connected to the left-hand side of the ECU (143) in FIG. 2 are components that provide data to the ECU (143), whereas components connected to the right hand side of the ECU (143) are components controlled by the ECU (143). Components feeding data to the ECU (143) include sensors that detect operations of the catalyst, turbocharger, compressor, CAC, or other elements. For example, the sensors may include a catalyst temperature sensor (69), an NOx sensor (83), an $O_2$ (Oxygen) sensor (85), a crankshaft position sensor (134), an accelerator pedal position sensor (151), and a brake pedal position sensor (153). On the other hand, components that are controlled by the ECU (143)

include the Internal Combustion Engine (ICE) (13), the turbocharger (19), the compressor (21), the BPV (124), and the scavenge valve (128). Each of the aforementioned components of the DEB engine (101) are connected to the ECU (143) with a wiring harness (155), which is a series of wires, optical fibers, printed circuits, or equivalent structures and associated connectors for transmitting signals between the components and the ECU (143).

Beginning with the components that feed data to the ECU (143), the catalyst temperature sensor (69) is embodied as a thermistor, thermocouple, or equivalent temperature detection device that measures the temperature of the catalyst. The catalyst temperature sensor (69) is affixed or attached to the catalyst (122), and data measured by the catalyst temperature sensor (69) includes data of the current temperature of the catalyst (122).

The accelerator pedal position sensor (151) and the brake pedal position sensor (153) are affixed to an acceleration pedal (not shown) and a brake pedal (not shown), respectively. The accelerator pedal position sensor (151) and the brake pedal position sensor (153) each include one or more associated potentiometers that capture and transmit a resistance measurement corresponding to the actuation degree of the respective pedal. The resistance captured by the accelerator pedal position sensor (151) corresponds to a driver request for additional torque (i.e., an increased vehicle speed), whereas the resistance captured by the brake pedal position sensor (153) corresponds to a driver request for less torque (i.e., a decreased vehicle speed). The requests provided by the pedal position sensors (151, 153) are passed to the ECU (143), which controls the DEB engine based on the driver request.

Components controlled by the ECU (143) include the ICE (13). The ICE (13) is controlled by facilitating fuel injection rates of fuel injectors positioned to inject fuel, such as gasoline, into the ICE (13). Further control over the ICE (13) is exerted by the ECU (143) controlling the aperture of the vanes of the turbocharger (19) and the compressor (21), which facilitates the amount of compressed air fed to the ICE (13). The ECU (143) further controls the rotation speed of the eEGR pump (23) to increase or decrease the amount of low NOx gases redirected from an exhaust outlet.

The ECU (143) also controls the aperture of each of the valves of the DEB engine (101). As discussed in relation to FIGS. 1B and 1C, some of the valves of the DEB engine are the scavenge valve (128) and the bypass valve (124).

Figure 3:
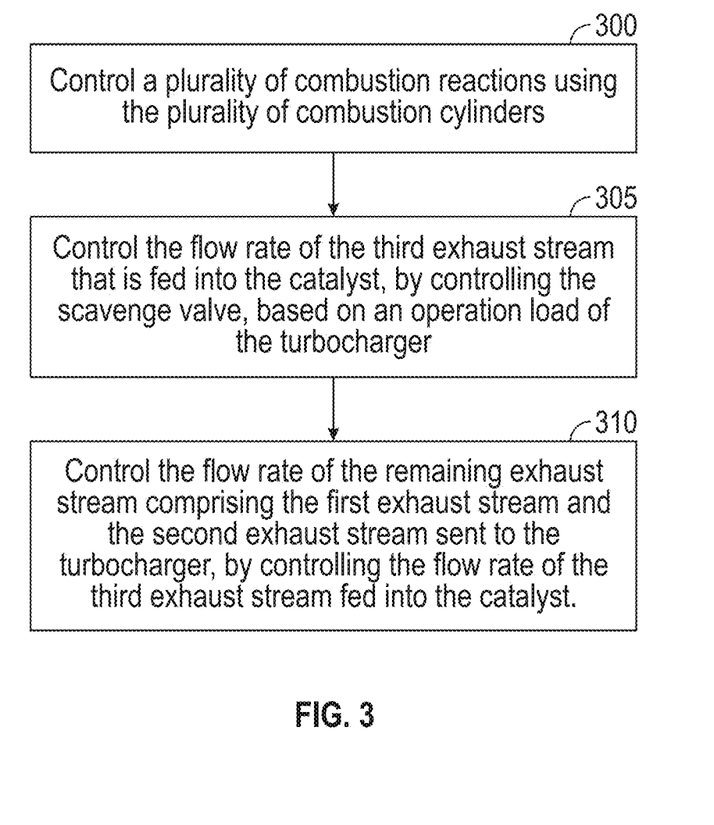
FIG. 3 depicts a flowchart of a method of operating a DEB engine in accordance with one or more embodiments disclosed herein.

FIG. 3 shows a flowchart for operating a DEB engine (101) using an ECU (143), in accordance with one or more embodiments. In one or more embodiments, one or more of the steps shown in FIG. 3 may be omitted, repeated, and/or performed in a different order than the order shown in FIG. 3. Accordingly, the scope of the invention should not be considered limited to the specific arrangement of the steps shown in FIG. 3. The steps shown in FIG. 3 are explained below.

In Step 300, the ECU (143) controls a plurality of combustion reactions using the plurality of cylinders. For example, as described with reference to FIG. 1B, the ECU (143) controls the combustion reactions inside the plurality of cylinders (112).

In Step 305, the ECU (143) controls the flow rate of the third exhaust stream that is fed into the catalyst, by controlling the scavenge valve. The ECU (143) may control the flow rate of the third exhaust stream based on an operation load of the turbocharger (118). Examples of this step are described above with reference to FIGS. 1B-1C, where the ECU (143) controls the flow rate of the third exhaust stream that streams in the third exhaust passage (130) and is fed into the catalyst (122).

In Step 310, the ECU (143) controls a flow rate of a remaining exhaust stream comprising the first exhaust stream and the second exhaust stream sent to the turbocharger (118). The ECU (143) may control the flow rate of the remaining exhaust stream by controlling the flow rate of the third exhaust stream fed into the catalyst (122). Examples of this step are described above with reference to FIGS. 1B-1C, where the ECU (143) controls the flow rate of the remaining exhaust stream comprising the first exhaust stream and the second exhaust stream, which respectively stream in the first and second exhaust passages (114, 116) and are sent to the turbocharger (118).

According to one or more embodiments, the method may include additional steps, for example one or more of the following operations.

According to one or more embodiments, the ECU (143) may estimate the catalytic conversion capacity of the catalyst (122). To this end, the ECU (143) may have the production rate of certain gases such as NOx and CO. The ECU (143) may determine whether the catalyst (122) is reaching its conversion rate capacity, based on the known production rate of the gases and the conversion rate of the catalyst (122). If the ECU (143) determines that the catalyst (122) is reaching or has exceeded its conversion capacity, the ECU (143) may control the aperture of the scavenge valve to send more exhaust gases to the turbocharger (118) and less exhaust gases through the third exhaust passage. As described above, this way, the turbocharger (118) captures some of the energy of the exhaust gases and thus, the gases that leave the turbocharger (118) to the catalyst (122) through the fourth exhaust passage have less energy in the catalyst (122) and more time to convert.

According to one or more embodiments, the ECU (143) may receive the measurements of the one or more gas sensors disposed after the catalyst (122) or toward the output of the catalyst (122). The ECU (143) may determine whether the catalyst (122) is reaching or has exceeded its conversion capacity, based on the measurements. For example, the ECU (143) determines, based on the measurements of the sensor (s), that the flow rate of NOx or CO after leaving the catalyst (122) is more than a first threshold, or that the flow rate of $O_2$ is less than a second threshold. On this basis, the ECU (143) may determine that the catalyst (122) has reached or exceeded its conversion capacity and cannot convert excess NOx or CO. Then, the ECU (143) may control the scavenge valve based on the measurements of the sensor(s). For example, when the sensor(s) detect that flow rate of NOx or CO is reaching or exceeding the first threshold or that the flow rate of $O_2$ has dropped to lower than the second threshold, the ECU (143) may control the aperture of the scavenge valve to send more exhaust gases to the turbocharger (118). The turbocharger (118) captures some of the energy of the exhaust gases by converting the energy to the torque of the turbine. Then, the exhaust gases leaving the turbocharger (118) to the catalyst (122), through the fourth exhaust passage, will have less energy in the catalyst (122) and more time to convert.

In one or more embodiments, the ECU (143) may control the flow rate of the third exhaust stream fed into the catalyst based on the capacity of the catalyst (122). For example, as described above with reference to FIG. 1B, the ECU (143) may control the flow rate of the third exhaust stream fed into the catalyst (122) based on the capacity of the catalyst (122). For example, the ECU may determine that the catalyst is reaching its capacity limits for converting emission gases and control the scavenge valve (128) based on this determination.

In one or more embodiments, the ECU (143) may control the compressor to control the compression rate of the compressor (104) by controlling the feed of exhaust gases into the turbocharger (118). The ECU (143) may control the flow rate of the third exhaust stream fed into the catalyst (122) based on the compression rate of the compressor (104) and an air compression rate thereof. For example, as described above with reference to FIG. 1B, the ECU (143) may control the flow rate of the third exhaust stream fed into the catalyst (122) based on the compression rate of the compressor (104).

In one or more embodiments, the ECU (143) may control the flow rate of the compressed air based on the flow rate of the third exhaust stream fed into the catalyst. For example, as described above with reference to FIG. 1B, the ECU (143) may control the flow rate of the compressed air based on the flow rate of the third exhaust stream fed into the catalyst (122).

In one or more embodiments, the ECU (143) may control the flow rate of the third exhaust stream fed into the catalyst based on the target power, target engine speed, or target torque of the DEB engine (101). For example, as described above with reference to FIG. 1B, the ECU (143) may control the flow rate of the third exhaust stream fed into the catalyst (122) based on the target power, target engine speed, or target torque of the DEB engine (101).

In one or more embodiments, the ECU (143) may control the ratio between the flow rate of the third exhaust stream fed into the catalyst and the flow rate of the remaining exhaust stream fed to the turbocharger (118) by controlling a single valve (i.e., the scavenge valve (128)). For example, as shown above with reference to FIG. 1B, the scavenge valve (128) may form a single valve that controls a ratio between the flow rate of the third exhaust stream fed into the catalyst (122) and the flow rate of the remaining exhaust stream fed to the turbocharger (118).

In one or more embodiments, for controlling the flow rate of the remaining exhaust stream, the ECU (143) may increase the flow rate of the third exhaust stream fed into the catalyst when the speed of the DEB engine (101) decreases. This may occur to avoid underpowering the scrolls of the turbocharger (118) to avoid backpressure buildup from not having enough exhaust gases to overcome turbine inertia.

Figure 4A:
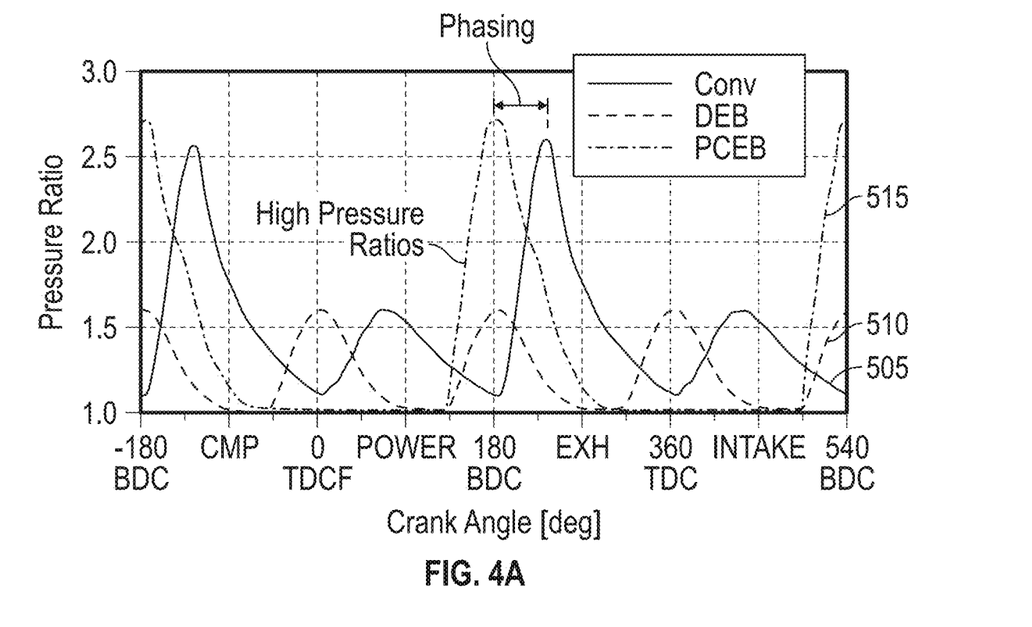
FIGS. 4A and 4B depict pressure ratios comparisons in accordance with one or more embodiments disclosed herein.

Benefits of the PCEB manifold (113) are discussed in relation to FIGS. 4A-7. FIGS. 4A and 4B specifically depict the benefits of pairing a dual scroll turbocharger (118) with a PCEB manifold (113). By way of background and as is known in the art, if a turbocharger operates without scrolls, then there will be pressure pulses because the combustion reaction creates instantaneous pressure in the cylinders. Such is depicted by the conventional engine pressure ratio line (505), which exhibits a large fluctuation in pressure ratios (i.e., a range of approximately 1.1 to approximately 2.6). In a DEB engine configuration, some of the pressure pulses may be mitigated because opposite cylinders may be paired. For example, when the first scroll receives exhaust gas from cylinder 1, there may be a Dirac-function pressure increase. However, the pressure gradually drops and increases again when cylinder 4 fires. So, if cylinders 1 and 4 are paired together, which fire at opposite times, the pressure pulses may have better effective timing to be more consistent and output a flat response. Such is reflected in the conventional DEB engine pressure ratio line (510), which exhibits less fluctuation in pressure ratios (i.e., a range of approximately 1.0 to approximately 1.6). Thus, the conventional DEB engine pressure ratio line (510) has a lower average magnitude, corresponding to a lower average pressure ratio, than the conventional engine pressure ratio line (505).

Figure 4B:
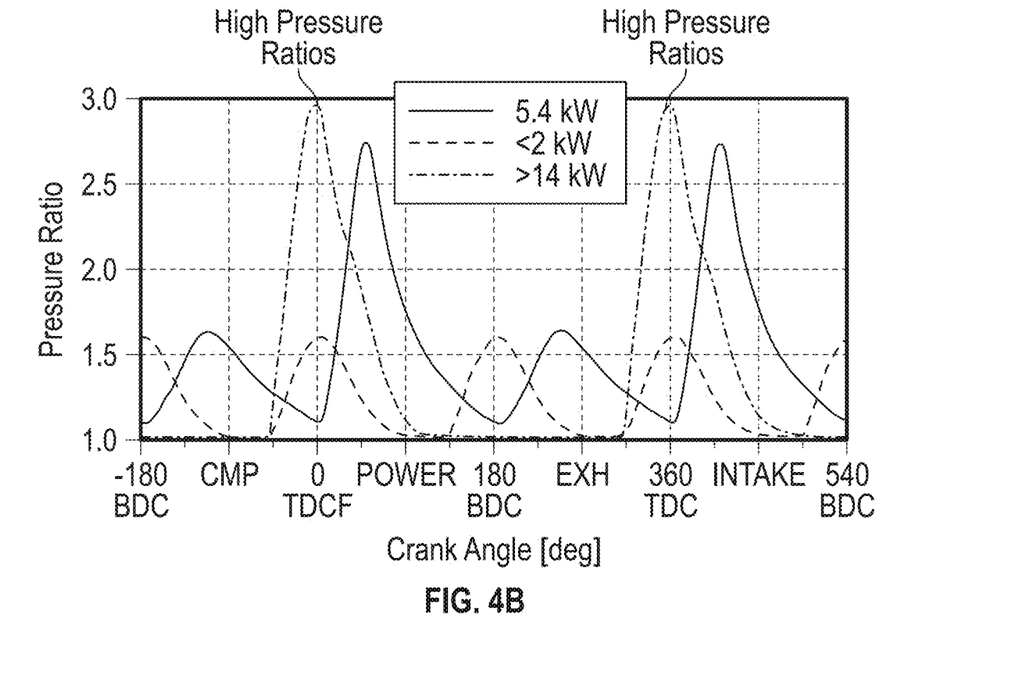

According to one or more embodiments, to mitigate a reduced average turbine pressure, the proposed DEB engine (101) with a PCEB manifold (113) includes the third exhaust passage, which bypasses the turbocharger (118). Accordingly, a pressure pulse effect of a conventional engine (by virtue of having a volume of gas that passes to the environment without actuating a component), as well turbine efficiency benefits of a dual scroll turbine in a traditional DEB engine, may be achieved. Such is reflected by virtue of a PCEB engine pressure ratio line (515), which exhibits higher peaks and lower valleys than the conventional engine pressure ratio line (505) and the conventional DEB pressure ratio line (510).

The DEB engine (101) according to one or more embodiments provides a simpler and low cost technical design that can improve the engine's performance at low RPM and high load conditions. According to one or more embodiments, as a result of increased pressure ratios reflected in the PCEB engine pressure ratio line (515), not only the total engine flow may increase but also the exhaust temperature may be elevated, combining to a cycle-averaged turbine power of approximately 14 kW for the DEB engine (101), almost 7 times higher than the traditional DEB engine and approximately 3 times higher than a conventional engine.

Figure 5A:
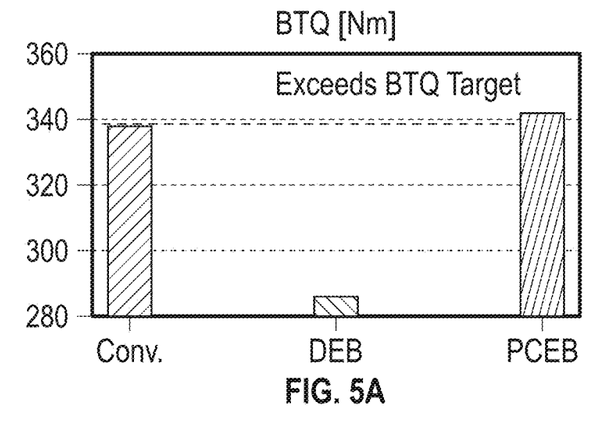
FIGS. 5A-5D depict graphs comparing engine operating parameters in accordance with one or more embodiments disclosed herein.

FIGS. 5A-5D describe other benefits of utilizing a DEB engine (101) with a PCEB manifold (113) as described herein at a 2000 RPM wide-open-throttle (WOT) condition. One of the challenges for a traditional DEB engine may be a compromise of performance at low engine RPM and high load condition, also known as low-end-torque (LET). As shown in FIG. 5A, according to one or more embodiments, the Brake Torque (BTQ) at the 2000 RPM wide-open-throttle (WOT) condition for the traditional DEB engine was approximately 15% below the conventional engine's 338 Newton-meter (Nm) level. This may be primarily caused due to low exhaust enthalpy availability at the turbine inlet leading to a compromised intake pressure. For example, in a conventional DEB engine, blow-down interference flows from the four cylinders. This leads to an approximately 60% reduced peak-to-peak pressure pulsation for the traditional DEB engine, causing turbine power extraction below 2 kW, compared to a 5.4 kW level for a conventional engine. On the other hand, FIG. 5A demonstrates that the DEB engine (101) with a PCEB manifold (113) has a BTQ greater than that of a conventional engine, and much greater than a conventional DEB engine. The increased brake torque is due to an increase in turbine work from the increased average pressure ratio demonstrated in FIGS. 5A and 5B, which causes the turbocharger (118) to increase intake air pressure to the DEB engine (101).

Figure 5B:
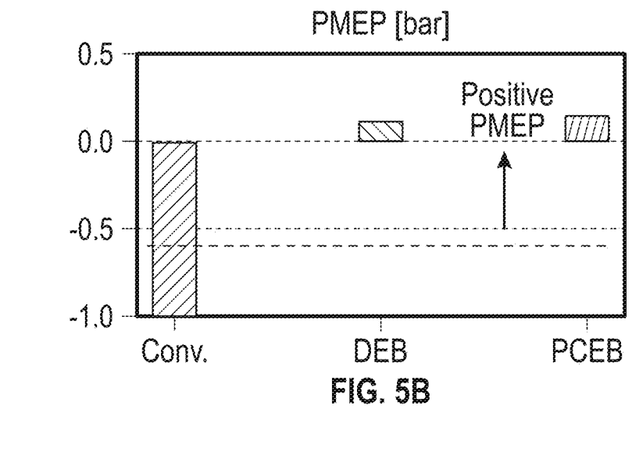

FIG. 5B demonstrates that the DEB engine (101) has a higher Pumping Mean Effective Pressure (PMEP) than a conventional engine. In general, PMEP relates to an engine's ability to perform work on gases in the cylinders (112) of the engine. A positive PMEP indicates that the engine is capable of producing more power than it consumes compressing combustion gases, whereas a negative PMEP indicates that the engine consumes more power than it produces compressing combustion gases. At LET conditions, FIG. 5B depicts that the conventional engine has a negative PMEP, whereas the conventional DEB engine and a DEB engine (101) with a PCEB manifold (113) each have positive PMEP values. When considered in combination with FIG. 5A, the DEB engine (101) having a PCEB manifold (113) delivers a high level of brake torque with a positive PMEP, in juxtaposition to both a conventional engine and a conventional DEB engine.

Figure 5C:
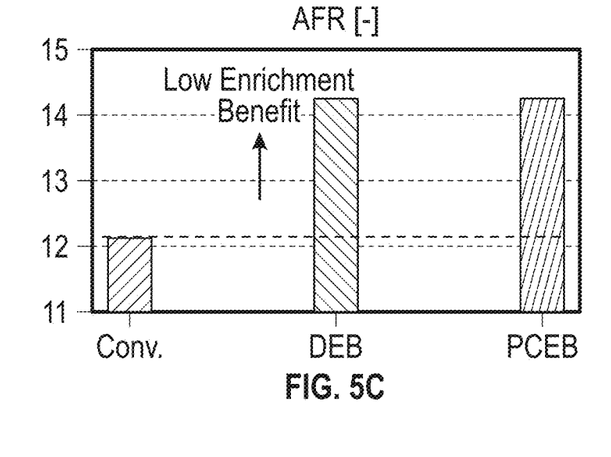

FIG. 5C depicts that both a conventional DEB engine and a DEB engine (101) having a PCEB manifold (113) have an Air/Fuel Ratio (AFR) greater than a conventional engine. For LET conditions, the best AFR for a conventional engine is approximately 12.1. On the other hand, the best AFR for a conventional DEB or a DEB engine (101) with a PCEB manifold (113) is approximately 14.2. In practice, this means that the DEB engine (101) utilizes less fuel than a conventional engine. When considering both FIGS. 5A and 5C, the DEB engine (101) having a PCEB manifold (113) advantageously provides a higher level of BTQ than a conventional engine and a conventional DEB engine, while also retaining the high AFR of a conventional DEB engine, thus providing high power in a fuel efficient manner.

Figure 5D:
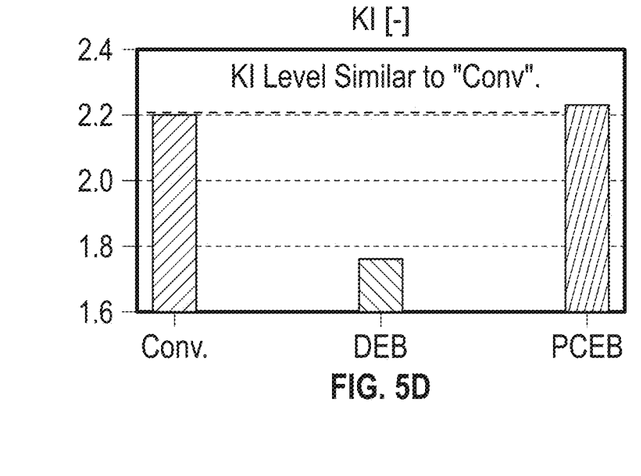

FIG. 5D depicts that a DEB engine (101) including a PCEB manifold (113) has a similar Knock Intensity (KI) to a conventional engine. Thus, a DEB engine (101) with a PCEB manifold (113) does not sacrifice knock compliance to achieve the above benefits. In particular, and despite the DEB engine (101) with a PCEB manifold (113) having a high BTQ and a low AFR, which would normally imply poor KI, the increased pressure ratios delivered by the turbocharger (118) allow the DEB engine (101) to operate at higher pressures. This results in the effects depicted in each of FIGS. 5A-5D, and allows the DEB engine (101) to offer a relatively high BTQ, a positive PMEP, a relatively high AFR, and a compliant KI under LET conditions.

Figure 6A:
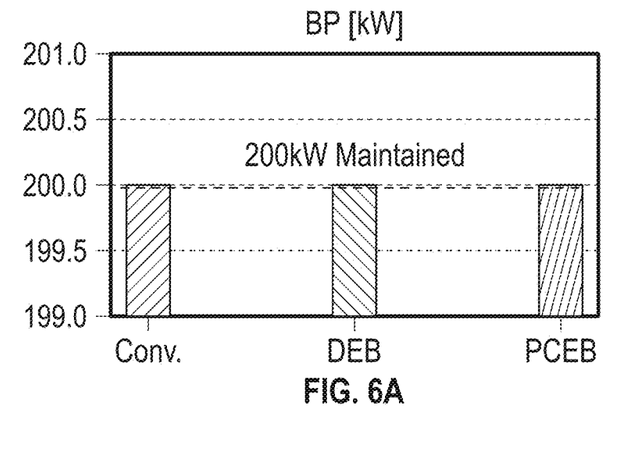
FIGS. 6A-6D depict graphs comparing engine operating parameters in accordance with one or more embodiments disclosed herein.
Figure 6B:
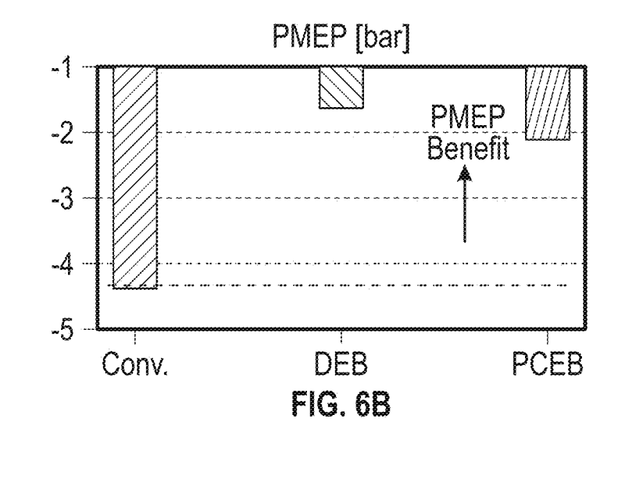
Figure 6C:
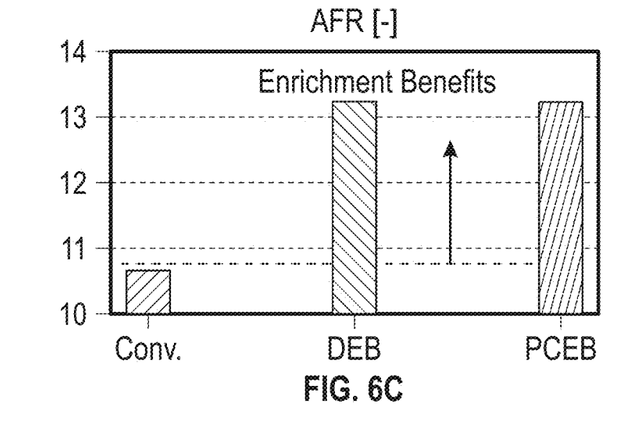
Figure 6D:
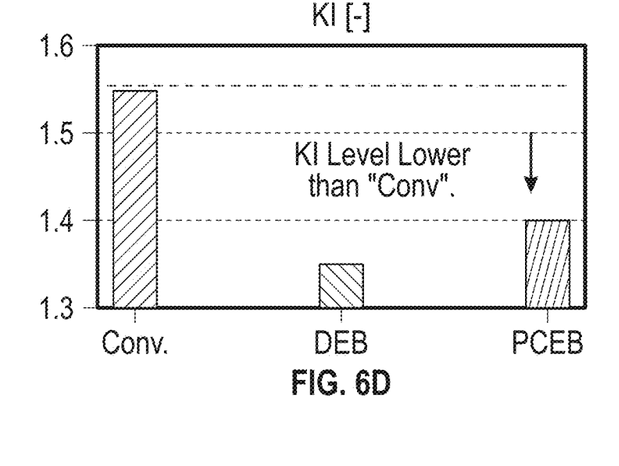

FIGS. 6A-6D describe benefits of a DEB engine (101) with a PCEB manifold (113) according to one or more embodiments described herein. Specifically, FIG. 6A depicts that each of the engine configurations are capable of producing 200 kW of Brake Power (BP) at a 5300 RPM rated engine speed. Thus, FIGS. 6B-6D illustrate comparisons between engine configurations at equivalent power and speed conditions. For example, while delivering a rated 200 kilowatt (kW) brake power (BP), the DEB engine may enable an approximately 50% lower pumping mean effective pressure (PMEP) compared to a conventional engine such as an SI engine (100). Such is demonstrated in FIG. 6B, which depicts that a DEB engine (101) with a PCEB manifold (113) achieves a PMEP of approximately -2.1 bar, compared to a PMEP of approximately -4.2 bar for a conventional engine. As shown in FIG. 6C, the DEB engine (101) with a PCEB manifold (113) may also enable a higher air-fuel ratio (AFR) at high speed conditions, which is shown by the PCEB manifold (113) embodiment having an AFR of approximately 13.2, compared to an AFR of approximately 10.8 for a conventional engine. The DEB engine (101) may also enable a lower knock induction time integral (KI), for example by approximately 13%. Such is shown in FIG. 6D, which demonstrates a KI of 1.55 for a conventional engine and a KI of 1.4 for a DEB engine (101) including a PCEB manifold (113). Overall, FIGS. 6A-6D thus depict that a DEB engine (101) including a PCEB manifold (113) offers multiple benefits over a conventional engine including, but not limited to: a lower negative PMEP (indicating less power loss; e.g., FIG. 6B), a high AFR (indicating a higher combustion temperature and lean burn conditions; e.g., FIG. 6C), and a lower KI (indicating better knock responsivity; e.g., FIG. 6D), at the same power output as a conventional engine (e.g., FIG. 6A).

Figure 7:
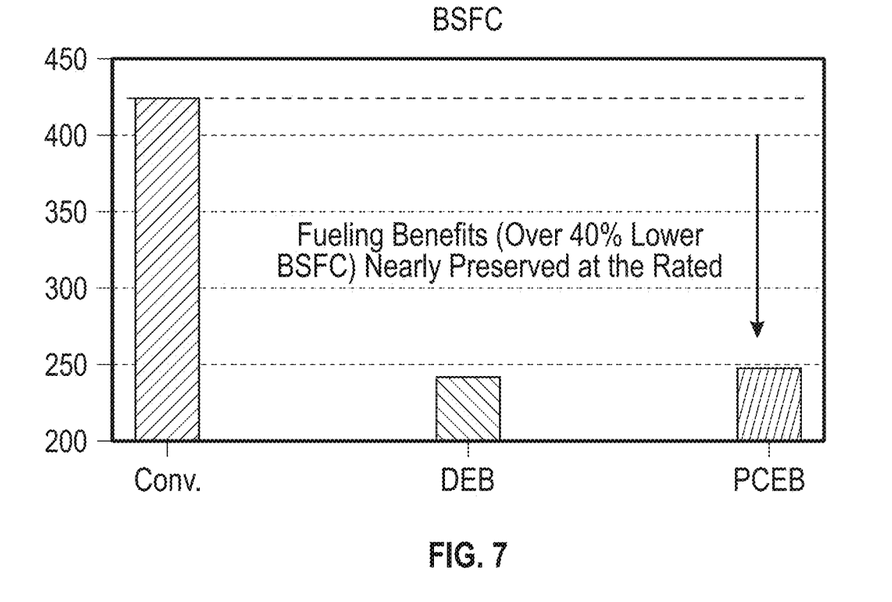
FIG. 7 depicts a graph of Brake Specific Fuel Consumption (BSFC) values for multiple engine configurations in accordance with one or more embodiments disclosed herein.

FIG. 7 depicts BSFC values for various engine configurations at a 5300 RPM engine speed and 200 kW BP output, akin to FIGS. 6A-6D. FIG. 7 demonstrates that a DEB engine (101) with a PCEB manifold (113) has a lower fuel consumption than a conventional engine. More specifically, per FIG. 7 the DEB engine (101) achieves a 40% reduction in Brake Specific Fuel Consumption (BSFC) levels compared to conventional engines. The DEB engine (101) with a PCEB manifold (113) performs similarly at other rated speeds and loads. Thus, when taking the BTQ targets depicted in FIG. 5A into account, the DEB engine (101) with a PCEB manifold (113) outperforms a conventional DEB engine in terms of BTQ output, while also outperforming the conventional engine in terms of BSFC and without sacrificing KI compliance.

In view of the above, the PCEB manifold (113) as depicted in FIG. 1C and in accordance with the embodiments presented herein allows for significant improvement to a conventional SI engine in performance.

Figure 8:
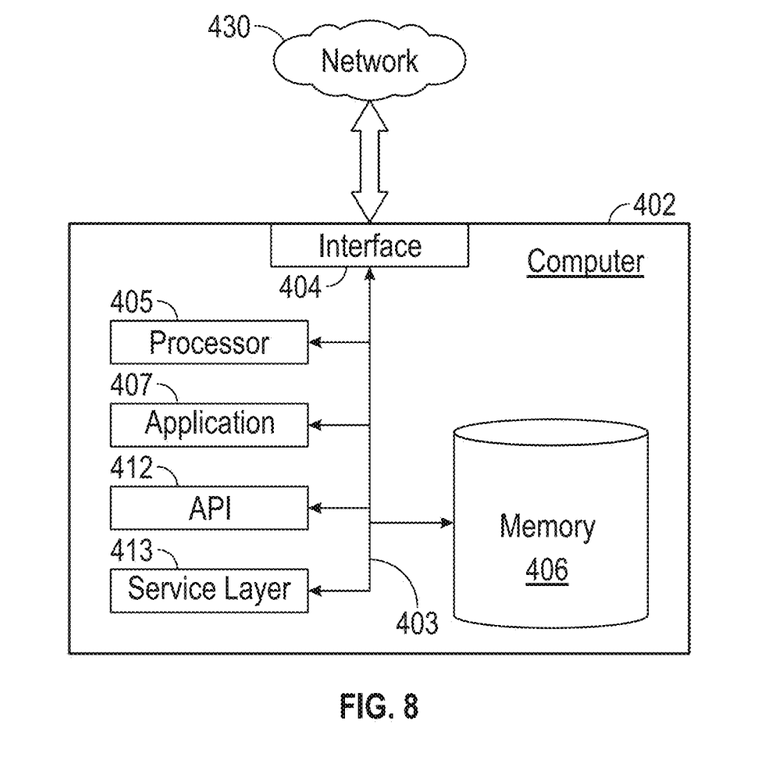
FIG. 8 depicts a computer system in accordance with one or more embodiments disclosed herein.

An example of a computer system embodying the ECU (143) is described with reference to FIG. 8, in accordance with one or more embodiments. FIG. 8 is a block diagram of a computer system used to provide computational functionalities associated with described PCEB engine, methods, functions, processes, flows, and procedures as described in the instant disclosure, according to an implementation. The illustrated computer (402) in the computer system is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include an input device, such as a keypad, keyboard, touch screen, or other device that can accept user (e.g., driver) information, and an output device that conveys information associated with the operation of the computer (402), including digital data, visual, or audio information (or a combination of information), or a GUI.

In one or more embodiments, the ECU described in the above embodiments may be incorporated into the computer (402), may be in the form of the computer (402), or may be implemented on the computer (402) such that the computer (402) performs the control operations described above with reference to FIGS. 1B-3. For example, the computer (402) on which the ECU is implemented includes tools for fetching the assets' data from a database, processing them, and communicating with the user.

The computer (402) can serve in a role as a client, network component, a server, a database or other persistency, or any other component (or a combination of roles) of a computer system for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with a server.

The computer (402) can receive requests over network (430) from a client application (for example, executing on another computer (402)) and responding to the received requests by processing the said requests in an appropriate software application. In addition, requests may also be sent to the computer (402) from internal users (for example, the driver or passengers), external or third-parties, other automated applications, as well as any other appropriate entities, individuals, systems, or computers.

Each of the components of the computer (402) can communicate using a system bus (403). In some implementations, any or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413)). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer (413). Software services, such as those provided by the service layer (413), provide reusable, defined functionalities through a defined interface. For example, the interface may be software written in JAVA, C++, Python, or other suitable language. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 8, two or more interfaces (404) may be used according to particular needs, desires, or particular implementations of the computer (402). The interface (404) is used by the computer (402) for communicating with other systems in a distributed environment that are connected to the network (430). Generally, the interface (404) includes logic encoded in software or hardware (or a combination of software and hardware) and operable to communicate with the network (430). More specifically, the interface (404) may include software supporting one or more communication protocols associated with communications such that the network (430) or interface's hardware is operable to communicate physical signals within and outside of the illustrated computer (402).

The computer (402) includes at least one computer processor (405). Although illustrated as a single computer processor (405) in FIG. 8, two or more processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a memory (406) that holds data for the computer (402) or other components (or a combination of both) that can be connected to the network (430). For example, memory (406) can be a database storing data consistent with this disclosure. In one example, memory (406) may store programs, algorithms, or instructions for controlling operation of the ECU that is described in the above embodiments. More specifically, in this example, the programs, algorithms, or instructions may be control operation of the ECU for controlling the DEB, particularly the scavenge valve. Although illustrated as a single memory (406) in FIG. 8, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, the application (407) can serve as one or more components, modules, applications, etc. In one example, the application (407) may include programs or algorithms for performing the controlling operation of the ECU that is described in the above embodiments. More specifically, in this example, the programs or algorithms may control operation of the ECU or other vehicle components described above with reference to FIGS. 1B-3. Further, although illustrated as a single application (407), the application (407) may be implemented as multiple applications (407) on the computer (402). In addition, although illustrated as integral to the computer (402), in alternative implementations, the application (407) can be external to the computer (402). In one example, the method described with reference to FIG. 3 may be implemented by the application (407).

There may be any number of computers (402) associated with, or external to, a computer system containing computer (402), each computer (402) communicating over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402).

Although only a few example embodiments have been described in detail above, those skilled in the art will readily appreciate that many modifications are possible in the example embodiments without materially departing from this invention. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A divided exhaust boost (DEB) engine comprising:
   a plurality of cylinders, each cylinder being configured to form a containment boundary that contains a corresponding combustion reaction of a plurality of combustion reactions;
   a turbocharger comprising a first scroll and a second scroll, wherein the turbocharger is configured to be actuated by exhaust gases produced by the plurality of combustion reactions;
   a first exhaust passage through which a first group of the plurality of the cylinders sends a first exhaust stream generated by the first group to the first scroll;
   a second exhaust passage through which a second group of the plurality of the cylinders send a second exhaust stream generated by the second group to the second scroll;
   a catalyst configured to receive the first exhaust stream and the second exhaust stream directly from the turbocharger;
   a third exhaust passage through which all of the plurality of cylinders send a third exhaust stream to the catalyst;
   a scavenge valve disposed in the third exhaust passage and configured to control a flow rate of the third exhaust stream; and
   an Electronic Control Unit (ECU) that controls, by controlling an aperture of the scavenge valve, a flow rate of the third exhaust stream that is fed into the catalyst based on an operation load of the turbocharger, and
   wherein the ECU controls a flow rate of a remaining exhaust stream comprising the first exhaust stream and the second exhaust stream sent to the turbocharger, by controlling the flow rate of the third exhaust stream fed into the catalyst.

2. The DEB engine of claim 1, wherein the ECU controls the flow rate of the third exhaust stream fed into the catalyst based on an anticipated capacity of the catalyst.

3. The DEB engine of claim 1, wherein the ECU controls the flow rate of the third exhaust stream fed into the catalyst based on one or more measurements provided by a Nitrogen Oxides (NOx) sensor or an Oxygen ($O_2$) sensor.

4. The DEB engine of claim 1, further comprising: a compressor that compresses air and feeds the compressed air into the turbocharger.

5. The DEB engine of claim 4, wherein the ECU controls the flow rate of the third exhaust stream fed into the catalyst based on a compression rate of the compressor.

6. The DEB engine of claim 4, wherein the ECU controls a flow rate of the compressed air based on the flow rate of the third exhaust stream fed into the catalyst.

7. The DEB engine of claim 1, wherein the ECU controls the flow rate of the third exhaust stream fed into the catalyst based on a target power or a target torque of the DEB engine.

8. The DEB engine of claim 1, wherein the ECU controls the flow rate of the third exhaust stream fed into the catalyst, to control the flow rate of the remaining exhaust stream sent to the turbocharger, based on a pressure inside the turbocharger.

9. The DEB engine of claim 1, wherein the scavenge valve forms a single valve that controls a ratio between the flow rate of the third exhaust stream fed into the catalyst and the flow rate of the remaining exhaust stream sent to the turbocharger.

10. The DEB engine of claim 1, wherein the first exhaust passage, the second exhaust passage, and the third exhaust passage are fluidly connected to the plurality of cylinders with a Paired Cylinder Exhaust Boost (PCEB) manifold.

11. A method for controlling a divided exhaust boost (DEB) engine, wherein the DEB engine comprises:
    a plurality of cylinders, each cylinder being configured to form a containment boundary that contains a corresponding combustion reaction of a plurality of combustion reactions;
    a turbocharger comprising a first scroll and a second scroll, wherein the turbocharger is configured to be actuated by exhaust gases produced by the plurality of combustion reactions;
    a first exhaust passage through which a first group of the plurality of the cylinders sends a first exhaust stream generated by the first group to the first scroll;
    a second exhaust passage through which a second group of the plurality of the cylinders send a second exhaust stream generated by the second group to the second scroll;
    a catalyst configured to receive the first exhaust stream and the second exhaust stream directly from the turbocharger;
    a third exhaust passage through which all of the plurality of cylinders send a third exhaust stream to the catalyst; and
    a scavenge valve disposed in the third exhaust passage and configured to control a flow rate of the third exhaust stream,
    wherein the method comprises:
      controlling the plurality of combustion reactions using the plurality of cylinders;
      controlling a flow rate of the third exhaust stream that is fed into the catalyst, by controlling an aperture of the scavenge valve, based on an operation load of the turbocharger; and
      controlling a flow rate of a remaining exhaust stream comprising the first exhaust stream and the second exhaust stream sent to the turbocharger, by controlling the flow rate of the third exhaust stream fed into the catalyst.

12. The method of claim 11, further comprising: controlling the flow rate of the third exhaust stream fed into the catalyst based on an anticipated capacity of the catalyst.

13. The method of claim 11, further comprising: compressing air with a compressor and feeding the compressed air to the turbocharger.

14. The method of claim 13, further comprising: controlling a flow rate of the compressed air based on the flow rate of the third exhaust stream fed into the catalyst.

15. The method of claim 11, further comprising: controlling the flow rate of the third exhaust stream fed into the catalyst based on a target power or a target torque of the DEB engine.

16. The method of claim 11, further comprising: controlling a ratio between the flow rate of the third exhaust stream fed into the catalyst and the flow rate of the remaining exhaust stream sent to the turbocharger by controlling a single valve.

17. The method of claim 11, wherein the controlling of the flow rate of the remaining exhaust stream comprises increasing the flow rate of the third exhaust stream fed into the catalyst when an engine speed of the DEB engine decreases.

18. The method of claim 11, further comprising: controlling the flow rate of the third exhaust stream fed into the catalyst in order to control the flow rate of the remaining exhaust stream sent to the turbocharger, based on a pressure inside the turbocharger.

19. The method of claim 11, further comprising: fluidly connecting the first exhaust passage, the second exhaust passage, and the third exhaust passage to the plurality of cylinders with a Paired Cylinder Exhaust Boost (PCEB) manifold.

20. The method of claim 11, further comprising: controlling the flow rate of the third exhaust stream fed into the catalyst based on one or more measurements provided by a Nitrogen Oxides (NOx) sensor or an Oxygen ($O_2$) sensor.

* * * * *